United States Patent
Ezzat et al.

(10) Patent No.: US 8,055,693 B2
(45) Date of Patent: Nov. 8, 2011

(54) METHOD FOR RETRIEVING ITEMS REPRESENTED BY PARTICLES FROM AN INFORMATION DATABASE

(75) Inventors: Tony Ezzat, Boston, MA (US); Evandro Gouvea, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 26 days.

(21) Appl. No.: 12/495,540

(22) Filed: Jun. 30, 2009

(65) Prior Publication Data

US 2009/0265162 A1    Oct. 22, 2009

Related U.S. Application Data

(63) Continuation-in-part of application No. 12/036,681, filed on Feb. 25, 2008.

(51) Int. Cl.
*G06F 7/00*    (2006.01)
*G06F 17/00*   (2006.01)
*G06F 17/30*   (2006.01)
*G10L 13/06*   (2006.01)

(52) U.S. Cl. ......... 707/899; 707/719; 707/730; 704/269
(58) Field of Classification Search .......... 704/270, 704/275; 706/48
See application file for complete search history.

(56) References Cited

U.S. PATENT DOCUMENTS

| | | | |
|---|---|---|---|
| 6,070,140 A * | 5/2000 | Tran | 704/275 |
| 6,618,699 B1 * | 9/2003 | Lee et al. | 704/209 |
| 7,089,188 B2 * | 8/2006 | Logan et al. | 704/270 |
| 2004/0117189 A1 * | 6/2004 | Bennett | 704/270.1 |
| 2008/0275837 A1 * | 11/2008 | Lambov | 706/48 |

OTHER PUBLICATIONS

E.W.D. Whittaker; "Particle-Based Language Modelling," International Conference on Speech and Language Processing (ICSLP), 2000.

Beth Logan et al. "Approaches to Reduce the Effects of COV Queries on Indexed Spoken Audio"; IEEE Transactions on Multimedia, vol. 7, No. 5, Oct. 2005 NSDOCID: <XP_11139269A_1_>.

* cited by examiner

*Primary Examiner* — Susan Chen
(74) *Attorney, Agent, or Firm* — Dirk Brinkman; Gene Vinokur

(57) ABSTRACT

A set of words is converted to a corresponding set of particles, wherein the words and the particles are unique within each set. For each word, all possible partitionings of the word into particles are determined, and a cost is determined for each possible partitioning. The particles of the possible partitioning associated with a minimal cost are added to the set of particles.

12 Claims, 12 Drawing Sheets

100

| ID | Item |
|---|---|
| 1090 | MCDONALDS |
| 1031 | RITE AID |
| 3421 | AASHIANI RESTAURANT |

*Fig. 2A*

| word | phonemes |
|---|---|
| HOURGLASS | AW R G L AE S |
| HOURLY | AW R L IY |
| HOURS | AW R Z |
| HOUSE | HH AW S |
| HOUSEHOLD | HH AW S HH OW L D |
| HOUSENKA | HH AW S EH NG K AH |
| HOUSENKA(2) | HH AW S EH N K AH |
| HOUSES | HH AW Z AH Z |
| HOUSES(2) | HH AW S IH Z |
| HOUSING | HH AW Z IH NG |
| HOUSTON | HH Y UW S T AH N |
| HOUSTON(2) | HH AW S T AH N |

*Fig. 2B*

| word | particles |
|---|---|
| HOURGLASS | AW_R + G_L_AE_S |
| HOURLY | AW_R + L_IY |
| HOURS | AW_R + Z |
| HOUSE | HH_AW_S |
| HOUSEHOLD | HH_AW_S + HH_OW_L_D |
| HOUSENKA | HH_AW_S + EH_NG + K_AH |
| HOUSENKA(2) | HH_AW + S_EH_N + K_AH |
| HOUSES | HH_AW_S + IH_Z |
| HOUSES(2) | HH_AW + Z + AH + Z |
| HOUSING | HH_AW + Z + IH_NG |
| HOUSTON | HH_AW_S + T_AH_N |
| HOUSTON(2) | HH_Y_UW + S + T_AH_N |

*Fig. 3*
*300*

| ID | Item |
|---|---|
| 1090 | M_AE_K_AH_D_AA_N_AH_L_D_Z |
| 1031 | R_AY_T+EY_D |
| 3421 | AA+SH_IY+AE_N_AH+R_E_S_T_R_AA_N_T |

Fig. 4
400

| particle | phonemes |
|---|---|
| AH | AH |
| AW_R | AW R |
| IH_NG | IH NG |
| IH_Z | IH Z |
| G_L_AE_S | G L AE S |
| HH_AW_S | HH AW S |
| HH_OW_L_D | HH OW L D |
| HH_Y_UW | HH Y UW |
| K_AH | K AH |
| S_EH_N | S EH N |
| T_AH_N | T AH N |
| Z | Z |

*Fig. 5*
*500*

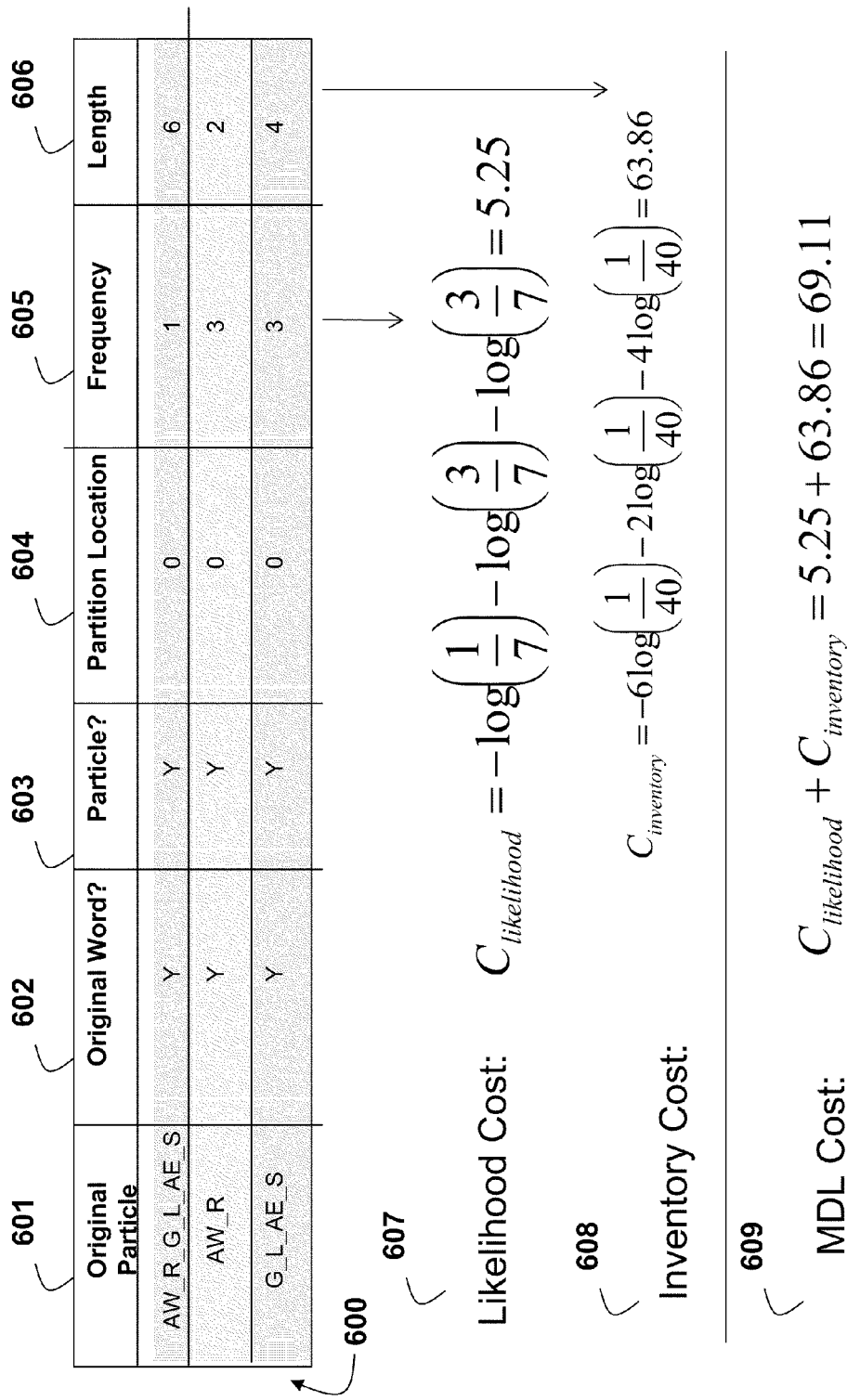

| Original Particle | Original Word? | Particle? | Partition Location | Frequency | Length |
|---|---|---|---|---|---|
| AW_R_G_L_AE_S | Y | Y | 0 | 1 | 6 |
| AW_R | Y | Y | 0 | 3 | 2 |
| G_L_AE_S | Y | Y | 0 | 3 | 4 |

Likelihood Cost: $C_{likelihood} = -\log\left(\frac{1}{7}\right) - \log\left(\frac{3}{7}\right) - \log\left(\frac{3}{7}\right) = 5.25$ Inventory Cost: $C_{inventory} = -6\log\left(\frac{1}{40}\right) - 2\log\left(\frac{1}{40}\right) - 4\log\left(\frac{1}{40}\right) = 63.86$ MDL Cost: $C_{likelihood} + C_{inventory} = 5.25 + 63.86 = 69.11$

*Fig. 6*
*600*

```
processwords(table, desired#particles):
    for all original words in table,
        newtable ← particlize(table, word)
    nump ← get all particles in table
    if nump <= desired#particles:
        output table
        stop
    else:
        processwords(newtable, desired#particles)
```

Fig. 7
700

```
particlize(table, entry):

// IF ENTRY IS ALREADY PARTICLIZED, THEN POP OFF THE PARTICLIZATION //
// FROM THE TABLE //

// FIRST, TRY WITH ENTRY AS A PARTICLE OF ITS OWN //
bestSolution ← [ MDL Cost = Segmentation Cost + Compression Cost; no partition ]

// THEN TRY EVERY SPLIT OF THE ENTRY INTO TWO SUBSTRINGS //
for all substrings prefix and suffix such that prefix ∘ suffix = entry do
    for subword ∈ {prefix, suffix} do
        if subword is present in the table then
            increase count(subword) by count(entry)
            if subword is itself split, then propagate count(entry)
                to all children recursively
        else
            add subword with count(entry) into the table
            update length(subword) in table evaluate new MDL Cost
    if new MDL Cost < cost stored in bestSolution then
        bestSolution ← [new MDL Cost; prefix, suffix]

// SELECT THE BEST SPLIT OR NO SPLIT //
select the split (or no split) yielding bestSolution
update the table // PROCEED BY SPLITTING RECURSIVELY //
particlize(table, prefix)
particlize(table, suffix)
```

Fig. 8
800

| Words | Original Word? | Particle? | Partitio9n Location | Frequency | Length |
|---|---|---|---|---|---|
| AW_R_G_L_AE_S | Y | N | 3 | 1 | 6 |
| AW_R | Y | Y | 0 | 3+1=4 | 2 |
| G_L_AE_S | Y | Y | 0 | 3+1=4 | 4 |

Likelihood Cost: $C_{likelihood} = -\log\left(\frac{4}{8}\right) - \log\left(\frac{4}{8}\right) = 2.0$ Inventory Cost: $C_{inventory} = -2\log\left(\frac{1}{40}\right) - 4\log\left(\frac{1}{40}\right) = 31.93$ MDL Cost: $C_{likelihood} + C_{inventory} = 2.0 + 31.93 = 33.93$ Fig. 9
900

1000

METHOD FOR RETRIEVING ITEMS REPRESENTED BY PARTICLES FROM AN INFORMATION DATABASE

RELATED APPLICATION

This application is a continuation in part of U.S. patent application Ser. No. 12/036,681, "Method for Indexing for Retrieving Documents Using Particles," filed by Ramakrishnan et al., on Feb. 25, 2008.

FIELD OF THE INVENTION

This invention relates generally to information retrieval, and in particular to retrieving of items represented by particles.

BACKGROUND OF THE INVENTION

Information retrieval (IR) systems typically include a large list of items, such as geographic points of interest (POI), or music album titles. The list is accessed by an index. Input to the index is a query supplied by a user. In response to the query, the IR system retrieves a result list that best matched the query. The result list can be rank ordered according various factors. The input list of items, index, query and result list are typically represented by words. The input list of items, query and result list originates from text or speech.

Spoken queries are used in environments where a user cannot use a keyboard, e.g., while driving, or the user interface includes a microphone. Spoken document retrieval is used when the items to be retrieved are audio items, such as radio or TV shows. In those environments, an automatic speech recognizer (ASR) is used to convert speech to words.

The ASR uses two basic data structures, a pronunciation dictionary of words, and a language model of the words. Usually, the IR system represents the words phonetically as phonemes, e.g., RESTAURANT is represented as "R EH S T R AA N T." Phonemes refer to the basic units of sound in a particular language. The phonemes can include stress marks, syllable boundaries, and other notation indicative of how the words are pronounced.

The language model describes the probabilities of word orderings, and is used by the ASR to constrain the search for the correct word hypotheses. The language model can be an n-gram. If the n-grams are bigrams, then the bigram lists the probabilities such as P ("BELL"|"TACO"), which is the probability that the word "BELL" follows the word "TACO." The language model can also be a finite state grammar, where the states in the grammar represent the words that can appear at each state, and the transitions between states represent the probability of going from one state to another state.

There are two main problems with word-based IR.

First, important words for the IR are typically infrequent identifier words. For example, in an item POI "MJ'S RESTAURANT", the important identifier word is "MJ'S." Frequently, these identifier words are proper nouns from other languages. For example, the word "AASHIANI" in the item "AASHIANI RESTAURANT" is from the Hindi language. Another way these identifier words emerge is through combination, as with "GREENHOUSE." Modifying the roots of words also increases the size of the vocabulary. In general, the number of infrequent but important identifier words is very large.

In addition, important identifier words are often mispronounced or poorly represented by the language model. Accurate statistics for the n-grams also are generally unavailable. Hence, the probability of recognizing important infrequent words is low, and the word sequences are often incorrect. This leads to poor recall performance by the IR system.

Second, the computational load for word-based IR systems increases with the size of the list and index, and the performance of system becomes unacceptable for real-time retrieval.

SUMMARY OF THE INVENTION

The embodiments of the invention provide a method for retrieving items in an information retrieval (IR) database represented by particles. The number of unique particles is much smaller than the number of unique words, e.g., smaller by an order of magnitude. This improves the performance of an automatic speech recognition (ASR) system, leading to a decrease in recognition time by as much as 50%. Surprisingly, even though the number of particles is decreased dramatically when compared with the number of words, and the throughput increases likewise, the performance of IR system measured by the recall rate is improved by as much as 2%.

BRIEF DESCRIPTION OF THE DRAWINGS

FIG. 2A a table of an index of items of interest, written in terms of words;

FIG. 2B is a table of a pronunciation dictionary of words from the index;

FIG. 3 is a table of an example of a mapping from words to particles according to embodiments of the invention;

FIG. 4 is a table of an example of an index of items of interest, written in terms of particles, according to embodiments of the invention;

FIG. 5 is a table of a pronunciation dictionary of particles;

FIGS. 6, 9-10 are schematics of stages of an operation of particle generation process;

FIGS. 7-8 are pseudo-code of a method for mapping words to particles; and

DETAILED DESCRIPTION OF THE PREFERRED EMBODIMENT

Figure 1:
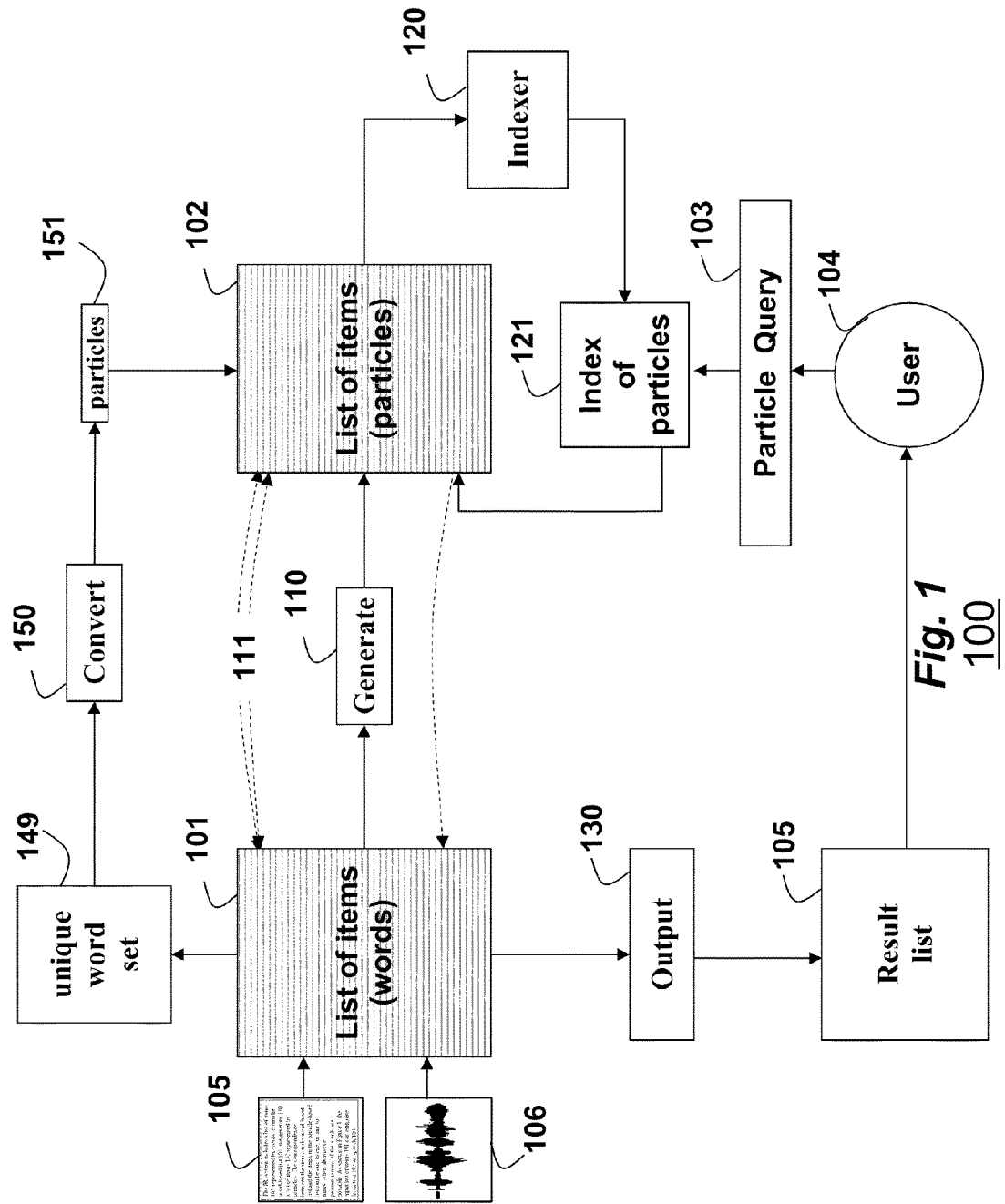
FIG. 1 is a block diagram of an information retrieval system according to embodiments of the invention.

As shown in FIG. 1, embodiments of our invention provide a method for retrieving items from a database in an information retrieval (IR) system 100. The steps of the method operate in a processor as known in the art. The processor includes memory and I/O interfaces.

The IR system includes a list of items 101 represented by words. From the word-based list 101, we generate 110 a list of items 102 represented by particles. The correspondence between the items in the word-based list and the items in the particle-based list can be one-to-one, or one-to-many, when alternative pronunciations of the words are possible. As shown in FIG. 1, the input list of items 101 can originate from text 105, speech 106 or both text and speech.

Particles are well known in the field of speech recognition. As defined herein a "particle" represents a concatenated phoneme sequence. A string of particles represents the phoneme sequence for a word, see Whittaker et al., "Particle-based language modelling," International Conference on Speech and Language Processing (ICSLP), 2000.

Up to now, particles have only been used to recognize words in an automatic speech recognizer (ASR) system. In contrast, the invention uses particles to perform information retrieval (IR).

We apply an indexer 120 to the list 102 to produce a particle-based index 121. To retrieve items, a particle-based query 103 is acquired from a user 104. The query can be derived from words in text, or speech using the ASR.

The query 103 is used to look up the index 121 constructed from the particle-based list 102. The output, in response to the query 103, is a result list 130 of items from the word-based list 101 that correspond to the best matching items in the particle-based list 102.

To generate the particle-based list 102, in a preprocessing step, we maintain a set of unique words 149 in the list 101. We convert the word-based set 149 to a set of unique particles 151. After we obtain the particle-based set 151, we can translate the words for the items in the list 101 to the corresponding particle-based items to generate 110 the particle-based list 102.

FIG. 2A shows the details of our word-based item list 101. The items are geographic points of interest, each ID 201 uniquely identifies the item 202.

FIG. 2B shows words 211 and corresponding phonemes 212. Some words can have alternate pronunciations, e.g., "HOUSES." FIG. 3 shows words 301 and corresponding particles 302.

If an item in the word-based list has multiple pronunciations, then a Cartesian product of all possible partitioning into particles for all the words is formed, and enumerated in the particle-based list. For example, if AASHIANI can be partitioned into particles as "AA_SH_IY AA_N_IY" or as "AA_SH Y_AE_N_IH," and RESTAURANT into particles as "R_E_S_T_R_AA_N_T" or as "R_E_S_T_ER_R_AA_N_T," then all possible partitionings are enumerated in the particle-based index:

AA_SH_IY AA_N_IY R_E_S_T_R_AA_N_T,
AA_SH_IY AA_N_IY R_E_S_T_ER_R_AA_N_T,
AA_SH Y_AE_N_IH R_E_S_T_R_AA_N_T, and
AA_SH Y_AE_N_IH R_E_S_T_ER_AA_N_T.

FIG. 4 shows details of the particle-based list 102, including a unique ID 401 for each item 402.

FIG. 5 shows a pronunciation dictionary that can be used by the ASR including particles 501 and corresponding phonemes 502.

Our language model includes particles, e.g., an n-gram language model that includes statistics on particle n-grams.

Method

The method of generating the particle-based 102 list from the word-based list 101 according the following ideas:

Top-Down Strategy: The method starts with unique words in the set 149 and partitions the words into particles;

Frequency-Based Segmentation: The method counts the frequencies of the words in the list 101. More frequently occurring words are kept intact, while infrequent words are partitioned into more frequently occurring particles; and Compression: The set of particles 151 is maintained, and the method is biased towards generating of a smaller set 151 to make the total number of different particles much smaller than the total number of different words.

We achieve about a ten-fold reduction in size, which improves IR retrieval throughput by about 50%, while at the same time increasing the recall performance by 2%.

FIG. 6 shows a table 600 used by the method to convert 150 words 149 to particles 151. Initially, each unique word in the list 101 is considered as one particle. For example, the word "AW R G L AE S" is considered a particle "AW_R_G_L_AE_S." We denote these as "initial particles" because they are obtained directly from the words in the list 101.

The table is initialized with a row 600 for each initial particle 601. In this example, the table includes three initial particles: AW_R_G_L_AE_S, AW_R, and G_L_AE_S. The method attempts to partition each original particle into smaller particles.

The table contains data structures to keep track of original particles and particles added to the table. In addition, the table contains data structures that indicate how the original particles were partitioned into smaller particles.

The Original Word? column 602 indicating whether the word was in the list 101 or not. The Particle? column 603 indicating whether the word was partitioned into particles or not. The Partition Location column 604 indicates where the partition was made. The Frequency column 605 indicates the frequency of occurrence c of the particle. The length column 306, indicating the length l of the particle in terms of phonemes.

Initially, the frequencies c are obtained from the frequencies of the corresponding words in the list 101. If an original particle is partitioned, the frequency count of the original particle is propagated to the new particles in the following manner. If the new particle does not exist in the table, then its frequency is set to the frequency of the parent particle. If the new particle already exists in the table, then its frequency is incremented by the frequency of the parent.

The current set of particles 151 is evaluated using a minimal description length (MDL) cost 609, which is the sum of a likelihood cost 607, and an inventory cost 608. The inventory cost represents the size of the particle set. The goal of the method is to select a partitioning the words into particles that reduces the overall MDL cost. The method terminates, for example, after the set 151 contains a desired number of particles.

The likelihood cost 607 is the sum of the log probabilities p of the particles in the set:

$$\text{likelihood cost} = \sum_{i \in particles} -\log(p_i),$$

where $$p_i = \frac{c_i}{\sum_{k \in particles} c_k},$$

and c are the particle frequencies, respectively.

The likelihood cost 607 decreases if the frequency of the particle occurrence increases. As a result, the method favors partitionings important infrequently occurring words into more frequently occurring particles.

The cost 608 is the sum of the lengths of all the particles in the set 151, in terms of phonemes, weighted by a log probability of each phoneme. In one embodiment, we assume that all phonemes are equally likely:

$$\text{inventory cost} = \sum_{i \in particles} -l_i \log(p_{phoneme}),$$

where $p_{phoneme}$ is the log probability of a phoneme.

The inventory cost decreases when the number of unique particles and their length decreases. As a result, our cost favors partitionings infrequent words into smaller and fewer particles. The inventory cost is a compressive cost to achieve the task of partitioning the words into particles such that the number of unique particles in the set 151 is much, much smaller than the number of unique words in the set 149.

Our size reduction is about an order of magnitude, which leads to a 50% increase in throughput, and a 2% increase in the accuracy of the recall rate.

FIG. 7 shows the general operation of the method. The input to the procedure is an initialized table and the desired number of particles to generate. The procedure iterates over all the unique words in the list 101. After each iteration over all the words, the procedure determines how many unique particles are created so far, and terminates if the desired number of unique particles has been achieved.

FIG. 8 shows the particlize( ) procedure of FIG. 7, which partitions words into particles. Each word is scanned from left to right, and partitioned into a prefix particle and a suffix particle. For each possible partitionings into the prefix particle and the suffix particle, including the choice of no partition, the MDL cost is evaluated and stored. The partitioning which minimizes the MDL cost is selected and added to the set 151. The procedure recurses on the prefix particle and the suffix particle.

FIG. 9 illustrates an example of how the method operates when considering partitioning the word AW_R_G_L_AE_S into prefix particle AW_R, and suffix particle G_L_AE_S. Because AW_R_G_L_AE_S is partitioned at the $3^{rd}$ phoneme, the Particle? flag 901 is set to N, and the partition location 902 is set to 3. Because both AW_R and G_L_AE_S already exist, their frequency 903 counts are incremented by 1 (the frequency of the word AW_R_G_L_AE_S). The likelihood cost 905, the inventory cost 906, and the MDL Cost 907 are evaluated. The partition of AW_R_G_L_AE_S into AW_R and G_L_AE_S reduces the MDL cost to 33.93, compared to the intact cost 69.11 as shown in FIG. 6, MDL Cost 609.

Figure 10:
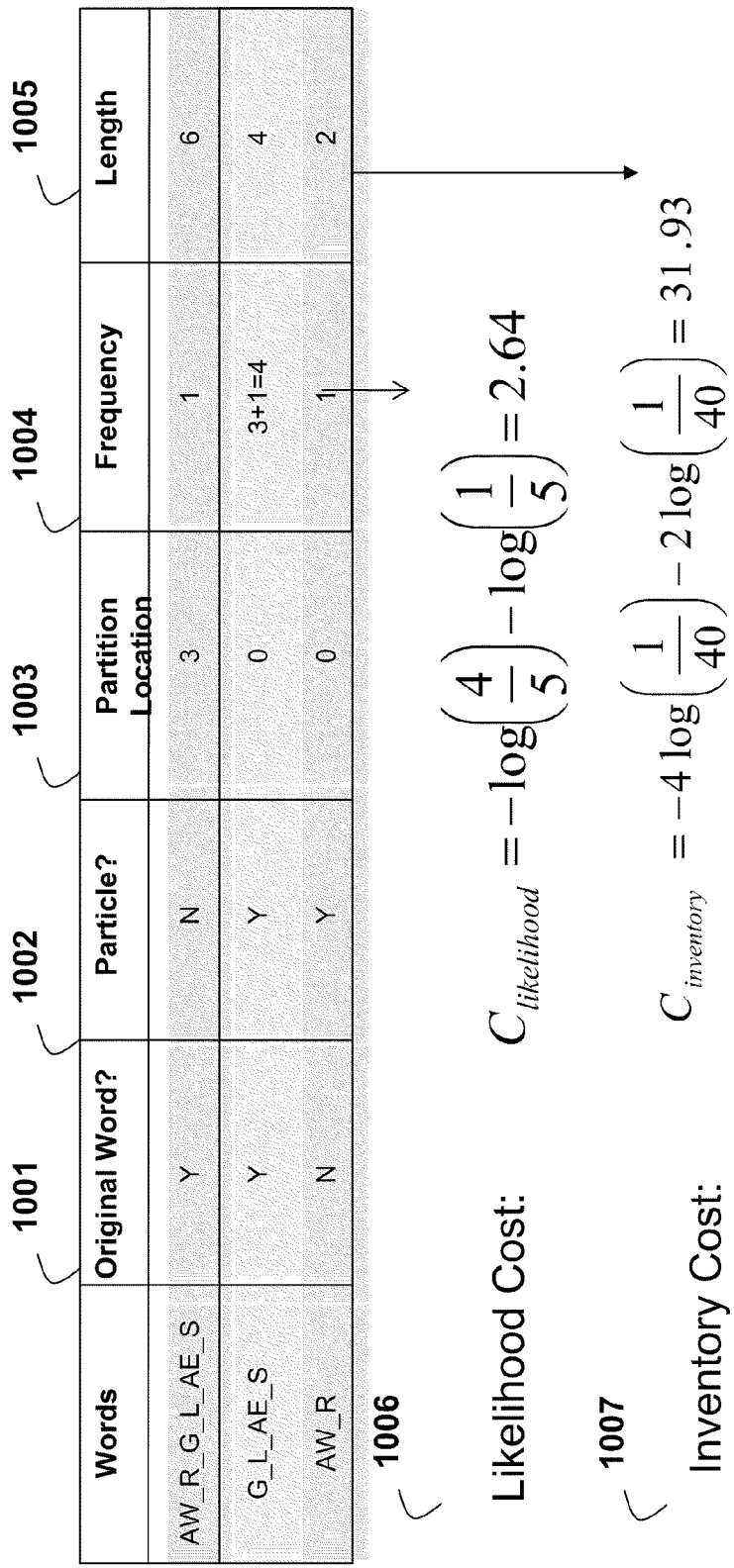

FIG. 10 shows adding a new particle to the set 151. This example assumes that the set 149 only contains the words AW_R_G_L_AE_S and G_L_AE_S. Therefore, AW_R does not initially exist in the table. When considering to partition AW_R_G_L_AE_S into a prefix particle AW_R and a suffix particle G_L_AE_S, an entry is generated for AW_R. Because the particle is not an original word, the Original Word? Flag 1001 is set to N. Because the particle is intact, the Particle? flag 1002 is set to Y indicating that word has not been partitioned, the partition location 1003 is set to 0, and the frequency c is set to 1 because the frequency is inherited from the original word AW_R_G_L_AE_S 1004. Finally, the length 1005 is set to 2. As before, the likelihood costs, inventory costs, and the MDL Costs are all determined for this partitioning. The partition of AW_R_G_L_AE_S into AW_R and G_L_AE_S reduces the MDL cost 407 to 34.57.

Extensions

Our method can be extended as follows:

Partitioning Evaluation: The likelihood cost effectively evaluates possible partitionings of a word into particles. A word is converted to particles that have higher probabilities. In general, a number of different evaluations are possible. For example, we can evaluate a particular partitioning in terms of:
a) Language model perplexity: In languages and speech processing, the perplexity is a measure of the constraint imposed by the grammar, or the level of uncertainty given the grammar, e.g., the average number of words that can follow a given word in a language model.
b) Inverse document frequency (IDF) cost: which is the sum of the individual IDFs of the particles.

Inventory Evaluation: The inventory cost evaluates the particles in the list 102, biasing the construction a list with fewer particles and fewer phonemes. A number of alternative index evaluation procedures can be used, for example: a desired distribution of particles in terms of their frequencies, lengths, similarity, or inverse document frequency (IDF) in the word index.

MDL Evaluation: The MDL Cost evaluates the sum of the likelihood cost and the inventory cost. A number of alternative combinations of Likelihood and inventory cost can be used, for example:
a) Weighted summations of likelihood cost and inventory cost, where the weights emphasize one cost over the other.

Using a greedy search procedure, or a depth-first search (DFS) to evaluate partitions of a word that minimizes the MDL cost. Alternatives include:
a) Greedy breadth-first search (BFS), and
b) Viterbi dynamic programming search.

Figure 11:
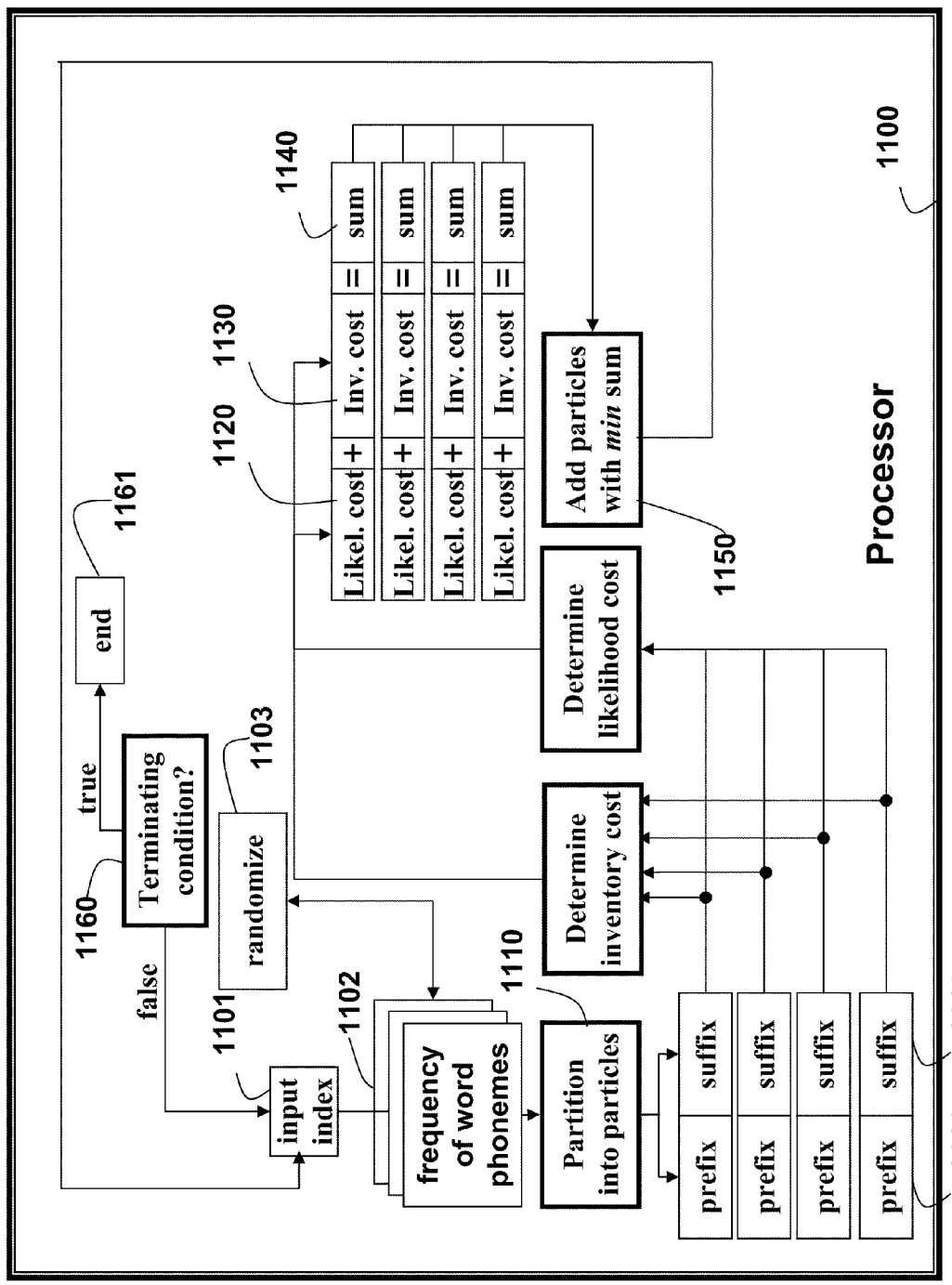
FIG. 11 is a flow diagram of a method for constructing the output particles index from the input index.

FIG. 11 shows steps of the method to be performed in a processor 1100 as known in the art. The processor includes memory for storing the various data structures and input and output interfaces.

The input is the set 149. For each unique word in the list 101, the original word particle, frequency, and length (in terms of phonemes 1102) are supplied for determining costs.

For each unique word, all possible partitionings 1110 into particles (prefix 1111 and suffix 1112) are determined. A sum 1140 of the inventory cost 1120 and the likelihood cost 1130 is determined for each possible partitioning 1110. The particles of the possible partitionings 1110 having a minimal sum are added 1150 to the set 151. If a partitioning of an original word particle is not performed, it is still considered an intact particle.

After all the words have been processed, a termination can be tested 1160, e.g., the set 151 has the desired number of particles, and the method terminates 1161 if true. Otherwise, if false, proceed by re-processing all the original word in the table in a new random order 1103 iteratively until termination.

Although the example application is described for an information retrieval system, the embodiments of the invention can be used for any application were the database includes words, and it makes sense to translate the words to particles. For example, automatic speech recognition (ASR) systems are a good candidate application.

Particularly, ASR systems are constrained in what they can recognize by the items contained in the pronunciation dictionary. If a spoken word is not in the dictionary, the ASR system is unable to recognize the word. This out-of-vocabulary (OOV) word can now be recognized by particles in the pronunciation dictionary, because particles offer more flexibility as to how the ASR system matches the speech to the items in then pronunciation dictionary.

The invention can also be used with any word based search engine, where the input is either text or speech and the items to be retrieved are text or speech.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for converting a set of words to a corresponding set of particles, comprising the steps of:
   acquiring the set of particles, each particle uniquely corresponds to a word in the set of words;
   defining a cost as a function of a size of the set particles, a frequency of occurrence of the particle in the set of particles, and a length of the particle, such that the cost decreases if the size of the set particles is decreased, the cost decreases if the frequency of occurrence of the particle in the set of particles is increased, and the cost decreases if a number of phonemes in the particle is decreased;
   partitioning each particle in the set of particles into a prefix particle and a suffix particle, if the partitioning minimizes the cost; and
   repeating the partitioning until a desired number of unique particles in the set is achieved, wherein the steps of the method are performed by a processor.

2. The method of claim 1, wherein the set of words is obtained from a word-based list of items, and further comprising:
   generating a corresponding particle-based list of items from the word-based list of items using the set of words and the set of particles.

3. The method of claim 2, further comprising:
   indexing the particle-based list of item using the set of particles to generate a particle-based index to the particle-based list of items.

4. The method of claim 3, further comprising:
   acquiring a query from a user;
   accessing the particle-based list of items using the particle-based index to retrieve particle-based items that best match the query; and
   outputting corresponding word-based items as a result list for the user.

5. The method of claim 1, wherein the query is text, and the text is converted to a particle-based query using the set of particles.

6. The method of claim 1, wherein the query is speech, and speech is converted to a particle-based query using the set of particles.

7. The method of claim 1, wherein the set of particles includes alternative pronunciations of the word.

8. The method of claim 1, wherein the cost includes a sum of a likelihood cost $$\sum_{i \in particles} -\log(p_i),$$

where $$p_i = \frac{c_i}{\sum_{k \in particles} c_k},$$

wherein c is the frequency of occurrence of the particle, and an inventory cost $$\sum_{i \in particles} -l_i \log(p_{phoneme}),$$

where $P_{phoneme}$ is a log probability of a phoneme used by a particle.

9. The method of claim 1, wherein the partitioning uses a left to right linear scan of the word.

10. The method of claim 1, wherein the partitioning is made at syllable boundaries of the word.

11. The method of claim 1, wherein the cost depends on an n-gram perplexity.

12. The method of claim 1, wherein the cost depends on a finite state grammar.

* * * * *